United States Patent [19]

Rainville

[11] Patent Number: 4,810,141

[45] Date of Patent: Mar. 7, 1989

[54] BLIND FASTENER

[75] Inventor: Gilles Rainville, Northridge, Calif.

[73] Assignee: Rockwell International Corporation, El Segundo, Calif.

[21] Appl. No.: 63,626

[22] Filed: Jun. 19, 1987

[51] Int. Cl.$^4$ ............................................. F16B 13/04
[52] U.S. Cl. ..................................... 411/38; 411/42; 411/55; 411/907
[58] Field of Search .................. 411/40, 41, 43, 45, 411/46, 55, 57, 60, 34–38, 42, 907, 908

[56] References Cited

U.S. PATENT DOCUMENTS

| | | | |
|---|---|---|---|
| 3,178,989 | 4/1965 | Siebol | 411/38 |
| 3,283,641 | 11/1966 | Wagner | 411/36 |
| 3,317,071 | 5/1967 | Teeter | 411/55 |
| 3,515,028 | 6/1970 | Patton | 411/42 |
| 3,653,294 | 4/1972 | Nason | 411/34 |
| 4,236,429 | 12/1980 | Dolch | 411/41 |

FOREIGN PATENT DOCUMENTS

| | | | |
|---|---|---|---|
| 601453 | 5/1948 | United Kingdom | 411/42 |
| 2093550 | 9/1982 | United Kingdom | 411/43 |

*Primary Examiner*—Neill R. Wilson
*Attorney, Agent, or Firm*—Charles T. Silberberg; Max Geldin

[57] ABSTRACT

A blind fastener is disclosed comprised of a rivet having an axial internally threaded bore and a threaded pin to be received within the threaded bore of the rivet. The rivet has a head at one end thereof, and preferably a chamfered bore at the other end thereof. The rivet is provided with a plurality of cuts in the outer wall of the rivet, extending axially along the wall of the rivet and forming zones of weakness in the rivet wall. The threaded pin has an outwardly protruding portion, preferably bell-shaped, and a head at the other end of the pin, such as a square head, for threading the pin through the rivet. When the pin is threaded into the rivet, the protruding bell-shaped end portion thereof is received within the chamfered bore of the rivet. The rivet-pin assembly is positioned in a hole of parts to be fastened. Further turning of the pin causes radial expansion of the inner end of the rivet against the zones of weakness therein, formed by the cuts in the rivet wall, and forms a blind head for locking the fastener in position on the parts which are fastened. The rivet is preferably formed of a rubber-like elastomeric material, and the pin is comprised of a metal.

13 Claims, 2 Drawing Sheets

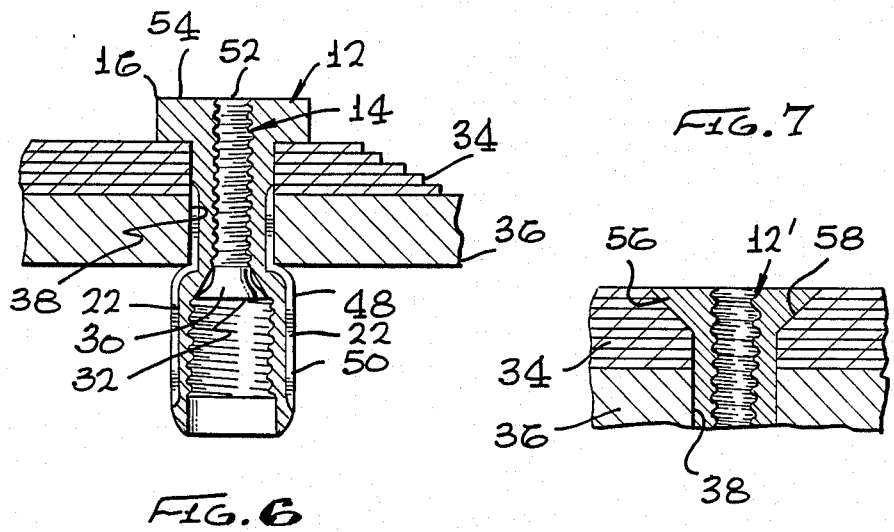
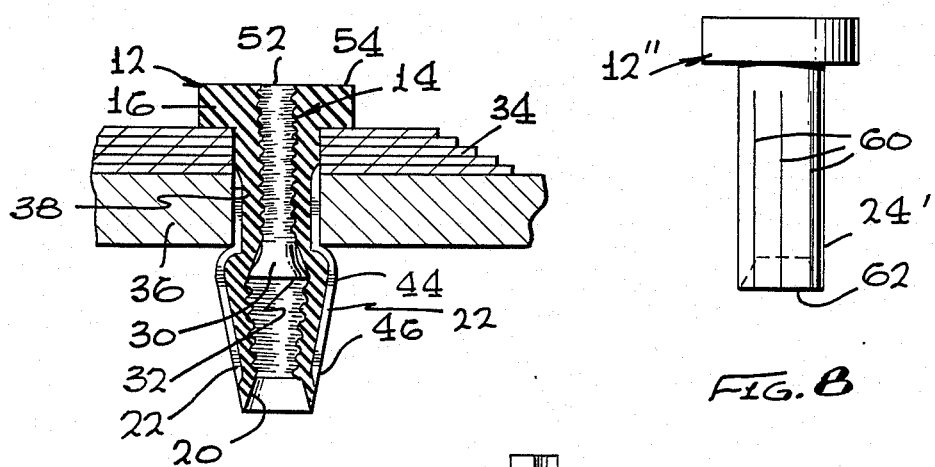
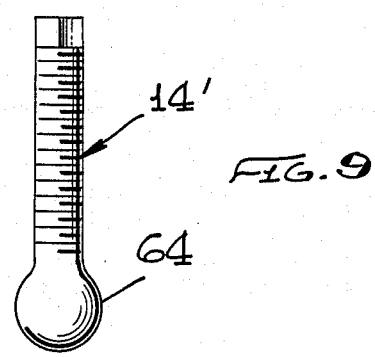

BLIND FASTENER

BACKGROUND OF THE INVENTION

This invention relates to a blind fastener and is particularly directed to a blind fastener comprised of a rivet and cooperating pin which is threaded into the rivet, the rivet and pin being so constructed that when the pin is threaded into the rivet against weakened zones therein, a blind head is formed on the rivet, locking the fastener in position.

Blind fasteners are often required for rapid repair of damaged aircraft. Presently available blind fasteners for this purpose have a limited grip range with respect to the length of the rivet, and hence, a large inventory of different length and grip-size rivets are required to be maintained in order to repair damaged components of aircraft at the site.

A variety of blind fasteners are known in the art for fastening together two sheets through an aperture in both sheets. Such blind fasteners generally employ a pin within a sleeve. The pin is adapted to be engaged by a tool which pulls the pin partially through the sleeve, forcing part of the sleeve outwardly to form a bulge abutting the sheet and preventing movement of the sheets against the bulge. Such pins are designed to break off upon the application of sufficient pulling force thereto.

An example of the above prior art type of blind fastener is disclosed in U.S. Pat. No. 4,046,053 to Alvi, et al. The fastener of Alvi is constructed of a very hard material, such as carbon steel. In this fastener, the inner pin is particularly designed to actually collapse and shrink as it is subjected to a pulling force. In order to shrink, the rivet must be subjected to a very high force requiring that the rivet be made of steel or such other material. Thus, the fastener of this patent is not adapted for use with composite rivets or with composite sheets comprised of an organic polymeric material because the high forces required to install such rivets would tend to damage both the sheets and the rivets.

It is an object of the present invention to provide a novel blind fastener comprised of a rivet, preferably constructed of non-metallic material, having an internally threaded bore and a threaded pin for threadable engagement with the rivet and arranged and constructed to form a blind head on the rivet when the pin is threaded into the rivet against zones of weakness provided in the rivet wall.

Another object of the invention is the provision of an improved multigrip fastener of the above type, which is adapted to grip over a wide range of fastener length, to thereby permit rapid fastening of components of varying thickness, particularly damaged aircraft components.

Yet another object is the provision of a blind fastener of the above type which is of simple construction and does not require the use of high force to install the fastener.

SUMMARY OF THE INVENTION

The above objects and advantages are achieved according to the invention by the provision of a blind fastener which comprises a rivet having an axial internally threaded bore, a head at one end thereof, and a plurality of cuts in the outer wall of the rivet, the cuts extending axially along the wall of the rivet and forming zones of weakness in the rivet wall. A threaded pin is provided and adapted to be received within the threaded bore of the rivet, the pin having an outwardly protruding portion, preferably of circular shape, at one end, and a head at the other end of the pin, e.g., square or of hexagonal shape, for applying a tool and threading the pin through the rivet.

When the fastener, comprised of the rivet and pin threadably engaged therein, is installed in a hole in components to be fastened together, the pin is turned and further threaded into the rivet whereby the protruding, e.g., circular shaped, end portion of the pin radially expands the other end of the rivet opposite the head thereof, against the zones of weakness therein formed by the cuts, and thereby forms a blind head for locking the fastener in position.

In preferred practice, the axial cuts extend only partially through the wall of the rivet and extend for a substantial axial distance along the wall of the rivet. The number of cuts in the rivet wall is optional, such cuts being substantially equally spaced around the periphery of the rivet wall and preferably extending intermediate the ends of the rivet along a major portion of the length of the wall and terminating closely adjacent opposite ends of the rivet. The other end of the rivet opposite the head thereon is preferably chamfered or bell-shaped to receive the outwardly protruding portion of the pin which is also preferably bell-shaped.

The outwardly protruding or bell-shaped portion of the pin has an outer diameter not greater than, and preferably approximately equal to the outer diameter of the rivet. This permits the assembly of the rivet, and the pin threaded therein, to be assembled in the bore of parts to be fastened together, from one side of such parts and the head of the pin can then be turned to form the blind head on the other side of the parts, as noted above, for fastening same together.

The rivet is preferably comprised of a non-metallic hard rubber-like resilient material, such as the material marketed as "Hytrel" which is a polyester elastomer, and the pin is preferably comprised of a metallic material, such as titanium or aluminum, so that when the pin is threaded into the rivet to form the radially expanded blind head, the expanded head has a conical shape, thereby locking the outwardly protruding, e.g., bell-shaped portion of the pin within the rivet and preventing unthreading of the pin from the rivet after installation.

In a preferred embodiment, an internally threaded rivet formed of "Hytrel" can be employed, having a protruding or countersink head shape, with eight axial cuts in the wall of the rivet, the rivet being chamfered at its opposite end, in combination with a threaded pin with a protruding bell shape at one end and a square or hexagonal shape at the other end.

The invention fastener provides a one-size multigrip self-sealing blind fastener having a grip range which corresponds essentially to the length of the cuts formed in the outer wall of the rivet. The fastener is simple to fabricate and in compatible for fastening composite components, e.g., or aircraft, at low and high temperature. It is easily and rapidly installed and is particularly advantageous for use in repairing damaged aircraft. For this purpose, a repair patch in the form, for example, of a composite laminate is bonded to the structural component to be repaired, and the invention fasteners are installed to further fasten and maintain the patch in secure sealing position on the structural component in the event that the edges or other portions of the patch peel away from bonding relation with the structural component.

BRIEF DESCRIPTION OF THE DRAWINGS

The invention will be more clearly understood by reference to the description below of certain preferred embodiments taken in connection with the following drawings wherein:

FIG. 5 shows the assembly of the rivet and pin for fastening a plurality of components together after the pin, as viewed in FIG. 4, has been further threaded into the rivet to radially expand the adjacent end of the rivet against the zones of weakness therein, to form a blind head at the end of the rivet which is of conical shape and locks the end of the pin in place so that it cannot be removed;

FIG. 6 is a view similar to FIG. 5 but wherein the material of which the rivet is formed is metal so that when the end of the rivet is radially expanded by the outwardly protruding end of the pin, the blind head which results has a substantially cyclindrical shape rather than conical;

FIG. 7 shows a modification of the rivet of the invention, having a countersink head;

FIG. 8 is another modification of the rivet of the invention wherein the axially disposed cuts in the wall of the rivet extend to the end of the rivet; and FIG. 9 illustrates a modification of the threaded pin, which has a spherical shape at one end.

Figure 1:
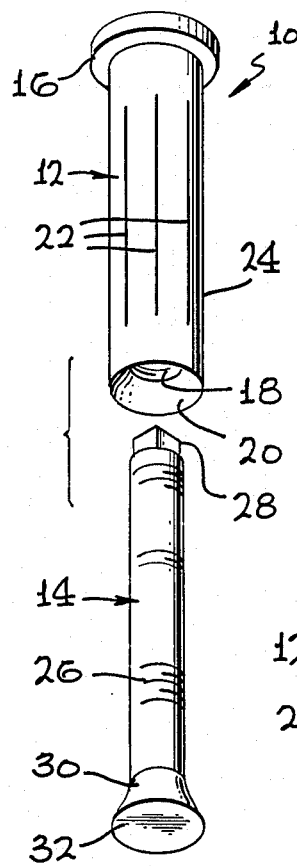
FIG. 1 is an exploded perspective view of a multigrip blind fastener according to the invention, comprising an internally theaded rivet and a threaded pin for installation in the rivet to form a blind head.

DETAILED DESCRIPTION OF THE INVENTION
AND PREFERRED EMBODIMENTS

Referring to FIGS. 1, 3, 4 and 4a of the drawings, numeral 10 indicates a blind fastener according to the invention, comprised of a sleeve 12 and a pin 14 which are cooperatively engaged in the manner described below, for fastening structural components.

The rivet 12 is formed with a protruding head 16 at one end and is provided with a central axial internally threaded bore 18 which extends from one end 19 adjacent the head and substantially entirely through the rivet, terminating at the opposite end of the rivet in a chamfered bore 20 formed in such other end of the rivet.

Figure 3:
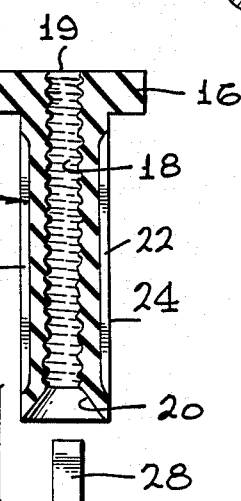
FIG. 3 is an elevational exploded view of the rivet and pin components, similar to FIG. 1.

The outer peripheral wall of the rivet 12 is provided with a plurality of cuts 22 extending axially along the wall of the rivet and forming zones of weakness therein. Although the number of such axially extending cuts 22 can vary, it is preferred to have from six to eight such cuts in the outer wall of the rivet. As seen in FIGS. 1 and 3, the cuts 22 in the rivet wall extend intermediate the ends of the rivet along a substantial, and preferably major, portion of the length of the rivet and terminate closely adjacent the opposite ends thereof, but do not actually extend to either end of the rivet. The cuts 22 are substantially equally spaced around the periphery of the rivet wall. The cuts extend from the outer surface only partially through the wall of the rivet, as best seen in FIGS. 3 and 4a.

According to one embodiment, eight axially extending cuts are provided in the rivet, the cuts each extending for about 75 to 80% of the length of the rivet, the opposite ends of the cuts being positioned between about 10 and 15% of the rivet length from the adjacent ends of the rivet.

The pin 14 has an externally threaded body portion 26 matching the internal threaded bore of the rivet. The pin 14 is provided with a square head 28 at one end thereof for turning the pin 14 in the rivet 12 by any suitable tool. The head 28 is of a size which permits free passage thereof through the internally threaded bore of the rivet as the pin is threaded therein. In place of a square head, any other suitable head, such as a hexagonal head, can be provided on the pin.

The opposite end of the pin terminates in an integral outwardly protruding portion 30. This protruding portion is generally of circular shape, such protruding end portion preferably being bell-shaped, as shown in FIGS. 1 and 3. The outer end 32 of the bell-shaped member 30 has a diameter approximately equal to or slightly smaller than the outer diameter of the rivet 12. The bell-shaped end portion 30 of the pin 14 is adapted to substantially match the shape and be received by the chamfered bore 20 of the rivet when the pin 14 is threaded completely into the rivet, as shown in FIG. 4.

The rivet is preferably comprised of a relatively hard rubber-like resilient material having properties similar to those of vulcanized or thermoset rubbers. A particularly preferred material for this purpose is the polyester elastomer marketed as "Hytrel" by DuPont. Although the rivet can be formed of a metal, such as aluminum, titanium or steel, it is not preferred, for reasons noted below.

The pin 14 is preferably comprised of a metal, such as aluminum, titanium or corrosion-resistant steel, to provide strength when the pin is screwed into the rivet to form a blind head during installation of the fastener, in the manner described below.

Figure 4:
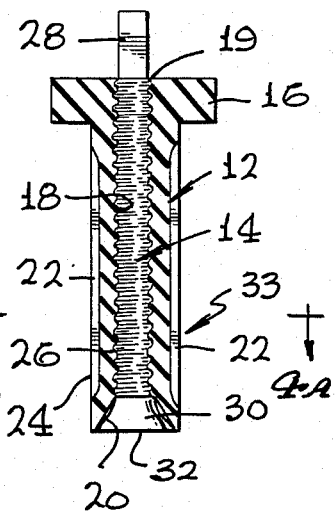
FIG. 4 shows the pin threaded into the rivet and ready for installations in a bore within a plurality of components to be fastened together.
Figure 4A:
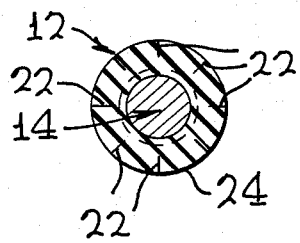
FIG. 4a is a horizontal section taken on line 4a—4a of FIG. 4.

Prior to installation for fastening structural components, the pin 14 is threaded into the rivet 12 by turning end portion 30 of the pin, as indicated in FIGS. 1 and 3, so that the pin is completely screwed into the rivet, with the bell-shaped end portion 30 of the pin received within the chamfered bore 20 at one end of the rivet, as seen in FIG. 4. If desired, a thread lubricant can be applied to the threaded body portion 26 of pin 14, prior to threading the pin into the rivet 12.

For use of the fastener assembly 33 of FIG. 4 for fastening structural components, for example, for securely attaching and maintaining in position a patch in the nature of a bonded repair doubler indicated at 34, and comprised of a composite laminate, initially bonded to a composite structural component 36 of an aircraft for repair of such component as a result of damage thereto, the rivet-pin assembly 33 of FIG. 4 is passed through an aperture 38 formed in the doubler 34 and structural component 36, the diameter of the rivet 12 of the assembled fastener being approximately the same as or slightly larger than the diameter of the aperture 38 to effect sealing thereof.

Figure 2:
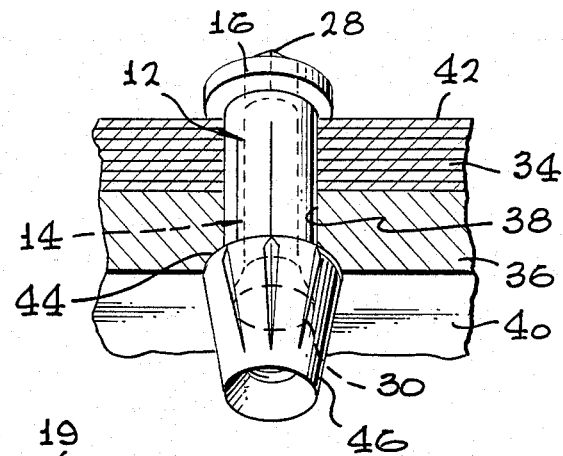
FIG. 2 shows the blind fastener of FIG. 1 assembled to fasten a plurality of components, and wherein the end of the rivet has been radially expanded by the outwardly protruding bell-shaped head of the pin to form a blind head of conical shape.

When assembled within the aperture 38, as seen in FIG. 2, the chamfered end 20 of the fastener assembly 33 is positioned adjacent the inner wall 40 of the structural component 36, and the head 16 of the fastener assembly abuts the outer surface 42 of the doubler component 34, with the square-shaped end 28 of the pin extending beyond the head 16 of the rivet. A tool, e.g., a wrench (not shown), is applied to the square end 28 of the pin, viewing FIG. 4, and while holding the head 16 of the rivet against the abutting outer surface 42 of the repair doubler 34 by suitable means, such as a plier or wrench, the pin is turned to force the bell-shaped end 32 of the pin against the wall of the chamfered bore 20 and against the zones of weakness in the wall 24 of the rivet, formed by the cuts 22, causing the lower end of the pin adjacent the chamfered wall 20 of the rivet to expand the lower end of the rivet and to form a blind conical head 44 on the rivet against the inner wall 40 of the structural component 36, to lock the fastener in position and securely fastening the components 34 and 36, as seen in FIGS. 2 and 5. Where the diameter of the rivet is slightly larger than the diameter of the hole 38, the resulting interference fit may be sufficient to maintain the rivet in position while the pin is being rotated.

The conical head 44 shown in FIG. 5, which tapers inwardly at 46, is formed as a result of the use of a relatively hard resilient rubber-like material, such as "Hytrel", which springs back to form the tapered end 46 of the conical head 44. The formation of such tapered conical head 44 at the inner end of the rivet, to produce the blind head, locks the pin 14 in fixed position in the rivet 12, with the bell-shaped end 32 of the pin retained within the chamfered bore 20 of the rivet, as shown in FIG. 5, and preventing unthreading of the pin from the rivet.

On the other hand, if a metallic-type rivet 12 is employed, after installation, as described above, to form the blind head 48, as seen in FIG. 6, since metal has substantially no resilience, there is no springback of the inner end 50 on the blind head formed on the rivet, and such blind head has a substantially cylindrical shape. In order to maintain the pin and end 30 thereof fixed in locked position within the rivet 12, as shown in FIG. 6, it is necessary to seal the pin inside the rivet by applying a sealant or glue to the bell-shaped end 32 of the pin prior to installation.

After the blind head, indicated at 44 in FIGS. 2 and 5, and at 48 in FIG. 6, has been formed to lock the rivet in position on the fastened parts, the outwardly extending end of the pin containing the square-shaped portion 28 can be removed by snipping or cutting, as indicated at 52 in FIGS. 5 and 6, so that the outwardly extending end of the threaded pin 14 is flush with the outer side 54 of the protruding head 16 of the rivet.

Various modifications of the blind fastener of the invention can be made.

Thus, in FIG. 7 there is shown a modified form of rivet 12' similar in structure to that of rivet 12, except that the rivet 12' has a countersink head 56 which is received in a matching countersunk bore 58 at the outer end of the hole 38 in the components 34 and 36 which are fastened.

In FIGS. 2, 5, 6 and 7, the installation of the rivets of the invention, to further fasten the composite laminated repair patch 34 to the structural component 36, serves to maintain the patch in secure sealing position on component 36 in the event that after a period of time, the edges or other portions of the bonded patch commence to peel away from the adjacent surfaces of the structural component.

In FIG. 8 there is shown a modification of the rivet 12'' wherein the axially extending cuts 60 in the outer wall 24' of the rivet extend to the inner end 62 of the rivet. This modification is applicable only for use with metallic rivets.

In still another modification, viewing FIG. 9, the pin shown at 14' has a spherical end shape 64 instead of the bell-shaped end 30 of the preferred form of rivet shown in FIGS. 1 and 3. The spherical-shaped end 64 of the pin 14', as in the case of the bell-shaped end portion 30 of the pin 14, has a diameter approximately equal to or slightly smaller than, the outer diameter of the cooperating rivet, e.g., rivet 12. As in the case of the bell-shaped portion 30 of rivet 12, the spherically shaped end 64 of rivet 14' is received within the chamfered bore 20 of the rivet 12, for expansion of the lower end of the rivet and formation of a blind head thereon, as described above.

From the foregoing, it is seen that the invention provides a simple two-part blind fastener which is readily installed and actuated to form a rivet with a blind head for readily securing components to be fastened together effectively and rapidly. The blind fastener of the present invention is particularly adapted for rapid repair of damaged aircraft components at the site. The fastener of the invention can be employed with aluminum or composite components of aircraft and does not require the use of high force to actuate the blind head, in contrast to the high force required to actuate, for example, the blind rivet of above U.S. Pat. No. 4,046,053.

Due to the length of the axial cuts forming zones of weakness in the wall of the invention fastener, the blind fastener has a long grip range, enabling the blind fastener of the invention to be employed for fastening components of varying thicknesses, providing a large number of different size fastener grips from a single fastener. This avoids the storage of a large number of blind fasteners of varying sizes for fastening or repair of aircraft components of different thicknesses. The blind fastener of the invention, particularly where the rivet is formed of an elastomeric material, is of relatively light weight and affords effective clamping for blind area attachments.

The multigrip blind fastener of the invention further is self-sealing and self-locking. It is easy to manufacture and of low cost. It is constructed of materials making it compatible with composite structural materials, that is, fiber-reinforced plastic components, at low and high temperature, and does not damage the outer skin of the components being fastened and will not crush or delaminate such composite materials during installation.

Since various changes and further modifications of the invention will occur to and can be made readily by those skilled in the art without departing from the invention concept, the invention is not to be taken as limited except by the scope of the appended claims.

What is claimed is:

1. A blind fastener which comprises:
   a rivet having an axial internally threaded bore, said rivet having a head at one end thereof and a plurality of cuts in the outer wall of said rivet, said cuts extending axially along the wall of said rivet and forming zones of weakness in the rivet wall, said rivet being non-metallic and comprised of a relatively hard rubber-like resilient material, and
a threaded pin comprised of a metallic material and adapted to be received within the threaded bore of said rivet, said pin having an outwardly protruding portion at one end, and a head at the other end of said pin for threading said pin through said rivet,
whereby said protruding end portion of said pin is adapted to radially expand said other end of said rivet against the zones of weakness therein formed by said cuts, thereby forming a blind head having a conical shape tapering from said protruding end portion, thereby locking the outwardly protruding portion of said pin within said rivet and preventing unthreading of said pin from said rivet.

2. The fastener of claim 1, said cuts extending only partially through the wall of said rivet and for a substantial axial distance along the wall of said rivet.

3. The fastener of claim 2, said cuts being substantially equally spaced around the periphery of the rivet wall and extending intermediate the ends of said rivet and along a major portion of the length of said rivet and terminating closely adjacent opposite ends thereof.

4. The fastener of claim 1, the other end of said rivet being chamfered to receive the outwardly protruding portion of said pin.

5. The fastener of claim 1, the outwardly protruding portion of said pin having a circular shape and having an outer diameter not greater than the outer diameter of said rivet.

6. The fastener of claim 5, said outwardly protruding portion of said pin being bell-shaped or spherically-shaped.

7. The fastener of claim 5, the outwardly protruding circular shaped portion of said pin having a diameter approximately equal to the outer diameter of said rivet.

8. A multigrip blind fastener which comprises:
a rivet having an axial bore, the wall of said bore being threaded along substantially the length of said bore, said rivet having a head at one end thereof and being chamfered at the other end thereof, and a plurality of cuts in the outer wall of said rivet, said cuts extending only partially through the wall of said rivet and along a major portion of the length of said rivet and terminating closely adjacent opposite ends thereof, said cuts forming zones of weakness in the rivet wall, said rivet being non-metallic and comprised of a relatively hard rubber-like resilient material, and
a threaded pin comprised of a metallic material received within the threaded bore of said rivet, said pin having an outwardly protruding bell-shaped portion at one end thereof and a head at the other end thereof for threading said pin through said rivet, said bell-shaped portion received within the chamfered end of said rivet, said bell-shaped end portion of said pin having an outer diameter approximately equal to the outer diameter of said rivet, and a suitable head at the other end of said pin for threading said pin through said rivet,
whereby said bell-shaped protruding end portion of said pin is adapted to radially expand the chamfered other end of said rivet against the zones of weakness formed by said cuts and thereby form a blind head having a tapered shape extending from said protruding end portion of said pin for locking the outwardly protruding portion of said pin within said rivet and preventing unthreading of said pin from said rivet.

9. The fastener of claim 8, the cuts extending through about one-half of the wall thickness of said rivet.

10. The fastener of claim 9, the cuts extending in length along about 75 to 80% of the length of the rivet.

11. The fastener of claim 10, there being about 6 to 8 of said axial cuts equally spaced around the periphery of the rivet wall.

12. The fastener of claim 8, said rubber-like resilient material being a polyester elastomer.

13. The fastener of claim 8, the head of said rivet being a protruding head or a countersink head, and the head of said pin being square or hexagonal shaped for receiving a suitable tool for turning said pin in said rivet, said pin being adapted to be severed flush with the outer surface of the head on said rivet after formation of the blind head on said rivet.

* * * * *